United States Patent
Kim et al.

(10) Patent No.: US 11,893,106 B2
(45) Date of Patent: Feb. 6, 2024

(54) APPARATUS AND METHOD FOR GENERATING SYSTEM CALL WHITELIST OF APPLICATION CONTAINER AND METHOD FOR CONTROLLING SYSTEM CALL OF APPLICATION CONTAINER

(71) Applicant: ELECTRONICS AND TELECOMMUNICATIONS RESEARCH INSTITUTE, Daejeon (KR)

(72) Inventors: Sung-Jin Kim, Daejeon (KR); Hyunyi Yi, Daejeon (KR); Chulwoo Lee, Daejeon (KR); Woomin Hwang, Daejeon (KR); Byungjoon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 510 days.

(21) Appl. No.: 16/944,480

(22) Filed: Jul. 31, 2020

(65) Prior Publication Data
US 2021/0390172 A1 Dec. 16, 2021

(30) Foreign Application Priority Data
Jun. 15, 2020 (KR) .................. 10-2020-0072511

(51) Int. Cl.
*G06F 21/53* (2013.01)
(52) U.S. Cl.
CPC ........ *G06F 21/53* (2013.01); *G06F 2221/034* (2013.01)

(58) Field of Classification Search
CPC .. G06F 21/53; G06F 2221/034; G06F 21/563; G06F 21/52; G06F 21/577; G06F 2009/45587; G06F 2221/033
See application file for complete search history.

(56) References Cited

U.S. PATENT DOCUMENTS

| | | | |
|---|---|---|---|
| 9,690,606 B1 † | 6/2017 | Ha | |
| 10,395,029 B1 † | 8/2019 | Steinberg | |
| 10,586,042 B2 | 3/2020 | Stopel et al. | |
| 2017/0116412 A1* | 4/2017 | Stopel .................. | G06F 21/577 |
| 2017/0116415 A1* | 4/2017 | Stopel .................. | G06F 21/52 |

(Continued)

OTHER PUBLICATIONS

Lingguang Lei et al., "SPEAKER: Split-Phase Execution of Application Containers," DIMVA 2017: Detection of Intrusions and Malware, and Vulnerability Assessment, pp. 230-251.

*Primary Examiner* — Beemnet W Dada
(74) *Attorney, Agent, or Firm* — LRK PATENT LAW FIRM (57) ABSTRACT

An apparatus and method for generating a system call whitelist for an application container. The method may include determining whether a container is based on machine code or non-machine code by analyzing the internal configuration of the running container, identifying system calls included in an application through binary static analysis or static analysis of source code selected depending on the determination of whether the container is based on machine code or non-machine code, and generating a whitelist based on the numbers of all of the identified system calls.

18 Claims, 9 Drawing Sheets

(56) References Cited

U.S. PATENT DOCUMENTS

2019/0324882 A1    10/2019   Borello et al.
2020/0159933 A1    5/2020   Ciano et al.
2020/0285733 A1*   9/2020   Kim ........................ G06F 21/53

\* cited by examiner
† cited by third party

APPARATUS AND METHOD FOR GENERATING SYSTEM CALL WHITELIST OF APPLICATION CONTAINER AND METHOD FOR CONTROLLING SYSTEM CALL OF APPLICATION CONTAINER

CROSS REFERENCE TO RELATED APPLICATION

This application claims the benefit of Korean Patent Application No. 10-2020-0072511, filed Jun. 15, 2020, which is hereby incorporated by reference in its entirety into this application.

BACKGROUND OF THE INVENTION

1. Technical Field

The disclosed embodiment relates to technology for controlling a system call of an application container in a container virtualization environment.

2. Description of Related Art

Application virtualization is receiving a lot of attention from the aspect of fast software development, and container virtualization technology is being used as a basis for realizing application virtualization. In application virtualization using containers, the separate container instances share the OS kernel of a host machine. Inside each instance, an application recognizes only the application itself and an operating system (OS).

However, because all container instances running on the same host machine share a single OS kernel, vulnerabilities in the OS kernel affect all of the container instances sharing the corresponding OS kernel.

For example, an attacker may access resources to which access is not permitted from inside an instance having user privileges by exploiting the vulnerability of a system call in a shared kernel, or may execute any command with host administrator's privileges. These so-called "container escape threats" are regarded as one of the most serious security threats to containers.

In order to reduce the above-described threats related to a shared kernel, a docker container provides the function of blocking unnecessary system calls invoked from each running instance by integrating a SECure COMPuting Mode (SECCOMP) mechanism into a container runtime, and reduces the attack surface of a shared kernel, thereby minimizing container escape threats.

Here, it is required to identify a system call whitelist for an individual container. Conventional security solutions do not provide the function of identifying a system call whitelist for an application. For example, vaccine solutions or Endpoint Detection and Response (EDP) solutions detect malicious code based on signatures or detect abnormal behavior of a process based on the behavior thereof, but do not provide a list of system calls available to an application.

Also, no method for restricting or monitoring system calls of a running application based on such a whitelist is provided.

DOCUMENTS OF RELATED ART (Patent Document 1) U.S. Pat. No. 10,586,042B2.

SUMMARY OF THE INVENTION

An object of the disclosed embodiment is to provide technology for generating a system call whitelist for an application container that is based on machine code or non-machine code in a container virtualization environment in order to solve the above-mentioned problems.

Another object of the disclosed embodiment is to provide technology for controlling the system call of the application container based on the generated whitelist.

A method for generating a system call whitelist for an application container according to an embodiment may include analyzing the internal configuration of a running container and determining whether the container is based on machine code or non-machine code; identifying system calls included in an application through binary static analysis or static analysis of source code, which is selected depending on the determination of whether the container is based on machine code or non-machine code; and generating a whitelist based on the numbers of all of the identified system calls.

Here, analyzing the internal configuration may include running the container using a run command in response to input of a container image and the run command; extracting files loaded into the memory address space of the running container; and determining whether the container is based on machine code or non-machine code by analyzing the extracted files.

Here, determining whether the container is based on machine code or non-machine code may be configured to determine that the container is based on machine code when the container includes an executable file, a shared library, and a configuration file, and to determine that the container is based on non-machine code when the container includes bytecode or script code in addition to a runtime binary and a configuration file.

Here, the binary static analysis may include identifying all external procedures in the shared library referenced by the executable file or a procedure based on a reference relationship between procedures in a disassembled binary; and extracting system call numbers by analyzing the code areas of the identified referenced procedures. The reference relationship may be determined based on whether a specific procedure has logic calling another procedure.

Here, the binary static analysis may include primarily identifying all external procedures in the shared library referenced by the executable file based on the reference relationship between the procedures in the disassembled binary; and secondarily identifying external procedures referenced by each of the identified external procedures. Secondarily identifying the external procedures may be repeated when a new reference relationship is found.

Here, identifying the system calls may be configured to perform static analysis in response to input of the executable file and the shared library extracted from the container when the container is based on machine code.

Here, identifying the system calls may be configured to perform static analysis of the source code when the container is based on non-machine code. Performing static analysis of the source code may include converting the extracted bytecode or script code into a binary form including machine code; and performing binary static analysis.

Here, identifying the system calls may include identifying an API of an external library referenced by the source code when the container is based on non-machine code; generating unit test data for the identified API; and monitoring system calls invoked during execution of generated unit test code and recording the invoked system calls, thereby mapping the recorded system calls to the API.

Here, generating the unit test data may be configured to automatically generate test data and test code required for a unit test.

A method for controlling a system call of an application container, performed by a system call control apparatus formed in the kernel space of a host, according to an embodiment may include monitoring system calls made by one or more virtualized application containers in real time; and interrupting the monitored system calls based on a previously generated whitelist of system calls required by the application containers.

Here, the method may further include, when, among the monitored system calls, a kernel event specified by a user is triggered, recording the kernel event in a ring buffer. A system-call-monitoring device in a user space may compare a record stored in the ring buffer with the whitelist, and may generate an alarm when a system call that is not included in the whitelist is present. Interrupting the monitored system calls may be performed in response to the generated alarm.

An apparatus for generating a system call whitelist for an application container according to an embodiment may include memory in which at least one program is recorded; and a processor for executing the at least one program. The at least one program may perform analyzing the internal configuration of a running container and determining whether the container is based on machine code or non-machine code; identifying system calls included in an application through binary static analysis or static analysis of source code, which is selected depending on the determination of whether the container is based on machine code or non-machine code; and generating a whitelist based on the numbers of all of the identified system calls.

Here, analyzing the internal configuration may include running the container using a run command in response to input of a container image and the run command; extracting files loaded into the memory address space of the running container; and determining whether the container is based on machine code or non-machine code by analyzing the extracted files.

Here, determining whether the container is based on machine code or non-machine code may be configured to determine that the container is based on machine code when the container includes an executable file, a shared library, and a configuration file, and to determine that the container is based on non-machine code when the container includes bytecode or script code in addition to a runtime binary and a configuration file.

Here, the binary static analysis may include identifying all external procedures in the shared library referenced by the executable file or a procedure based on a reference relationship between procedures in a disassembled binary; and extracting system call numbers by analyzing the code areas of the identified referenced procedures. The reference relationship may be determined based on whether a specific procedure has logic calling another procedure.

Here, the binary static analysis may include primarily identifying all external procedures in the shared library referenced by the executable file based on the reference relationship between the procedures in the disassembled binary; and secondarily identifying external procedures referenced by each of the identified external procedures. Secondarily identifying the external procedures may be repeated when a new reference relationship is found.

Here, identifying the system calls may be configured to perform static analysis in response to input of the executable file and the shared library extracted from the container when the container is based on machine code.

Here, identifying the system calls may be configured to perform static analysis of the source code when the container is based on non-machine code. Performing static analysis of the source code may include converting the extracted bytecode or script code into a binary form including machine code; and performing binary static analysis.

Here, identifying the system calls may include identifying an API of an external library referenced by the source code when the container is based on non-machine code; generating unit test data for the identified API; and monitoring system calls invoked during execution of generated unit test code and recording the invoked system calls, thereby mapping the recorded system calls to the API.

Here, generating the unit test data may be configured to automatically generate test data and test code required for a unit test.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

The advantages and features of the present invention and methods of achieving them will be apparent from the following exemplary embodiments to be described in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used here, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method according to an embodiment will be described in detail with reference to FIGS. 1 to 10.

Figure 1:
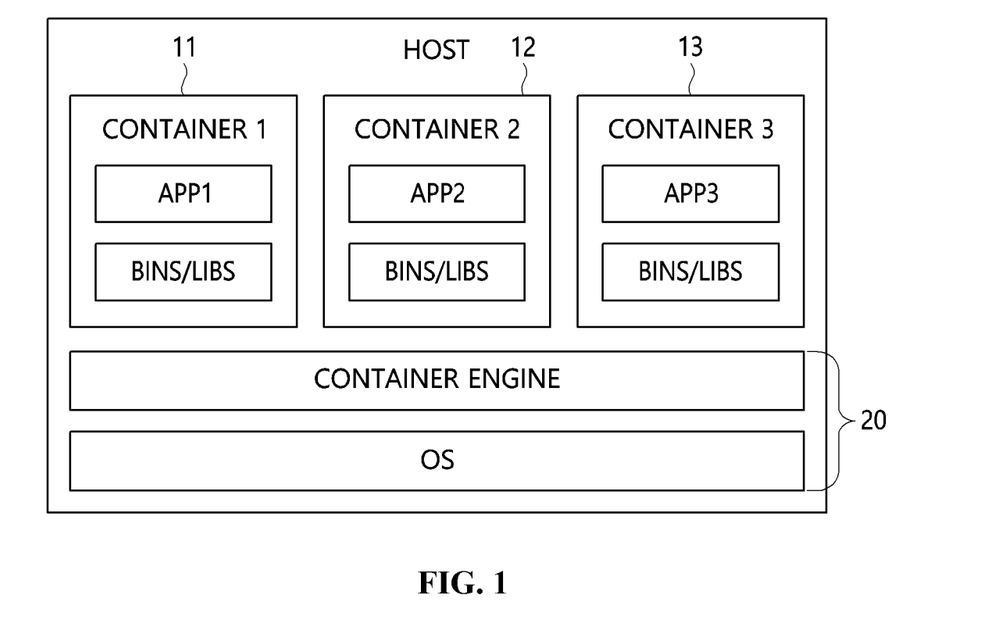
FIG. 1 is an exemplary view of application virtualization based on containers.

FIG. 1 is an exemplary view of containers for realizing application virtualization.

Referring to FIG. 1, individual container instances 11, 12 and 13 each have an executable file, the binary of a shared library, and an application.

Each of the container instances 11, 12 and 13 has its own process space, IPC, and network separated by namespaces, and may use only computing resources limited by control groups (cgroups). At run time, the container instances 11, 12 and 13 illustrated in FIG. 1 are running in the state in which they share the kernel 20 of an operating system (OS).

Meanwhile, the Application Container Security Guide (SP 800-190) released by NIST recommends limiting the system calls available to each container in order to securely run application containers, which are configured as shown in FIG. 1.

When following the guide, the attack surface of the shared kernel exposed to the container of an attacker is reduced, whereby security may be improved. In order to control invocation of system calls, it is necessary to first identify a system call whitelist required by a target application container.

Accordingly, an embodiment proposes an apparatus and method for generating a system call whitelist required by an application container.

Here, according to an embodiment, when an application container based on machine code and an application container based on non-machine code are input in order to identify system calls required by the application containers, system call whitelists for the respective application containers may be generated.

Figure 2:
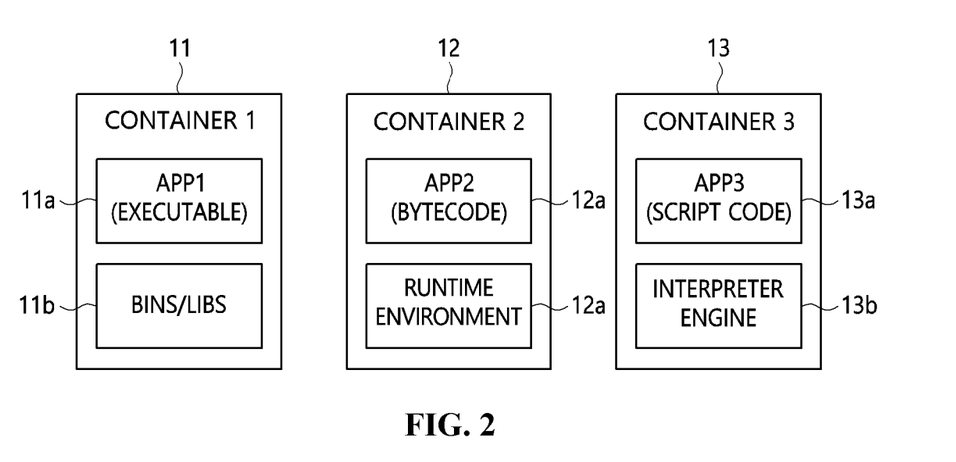
FIG. 2 is an exemplary view of application containers based on machine code or non-machine code.

FIG. 2 is an exemplary view of application containers based on machine code and on non-machine code.

Referring to FIG. 2, 'container 1' 11 is an example of an application based on native code or machine code, and includes an executable binary 11a and a shared library binary 11b.

Here, the application based on native code or machine code may be, for example, an application built by compiling code written in a C, C++, or Go language.

Also, 'container 2' 12 is an example of an application based on bytecode, and includes bytecode 12a and a runtime environment 12b for converting the bytecode into machine code and executing the machine code.

Here, the application based on bytecode may be, for example, an application consisting of Java bytecode or the like. Here, the runtime environment 12b includes a runtime executable file and shared libraries. For example, the java runtime environment may include a java executable file and shared libraries, such as 'libjli' and the like.

Also, 'container 3' 13 is an example of an application based on script code, and includes script code 13a and an interpreter engine 13b for converting the script code into machine code and executing the machine code.

Here, the script code 13a may be, for example, an application consisting of a Python script, or the like. Here, the interpreter engine 13b may include an executable file, corresponding to the interpreter engine, and shared libraries. For example, in the case of Python, the interpreter engine may include a Python execution file and shared libraries.

According to an embodiment, 'container 1' 11 shown in FIG. 2 may be defined as a container based on machine code, and 'container 2' 12 and 'container 3' 13 shown in FIG. 2 may be defined as containers based on non-machine code.

Accordingly, the embodiment proposes an apparatus and method for generating a system call whitelist depending on the characteristics of an application container.

Figure 3:
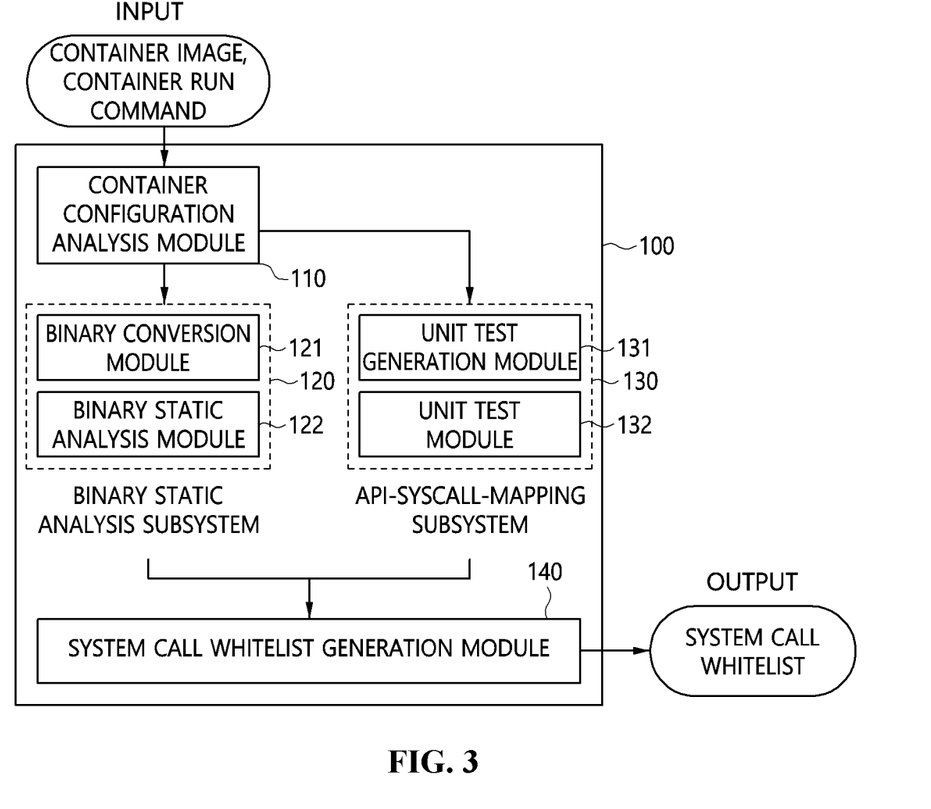
FIG. 3 is a schematic block diagram of an apparatus for generating a system call whitelist for an application container according to an embodiment.
Figure 4:
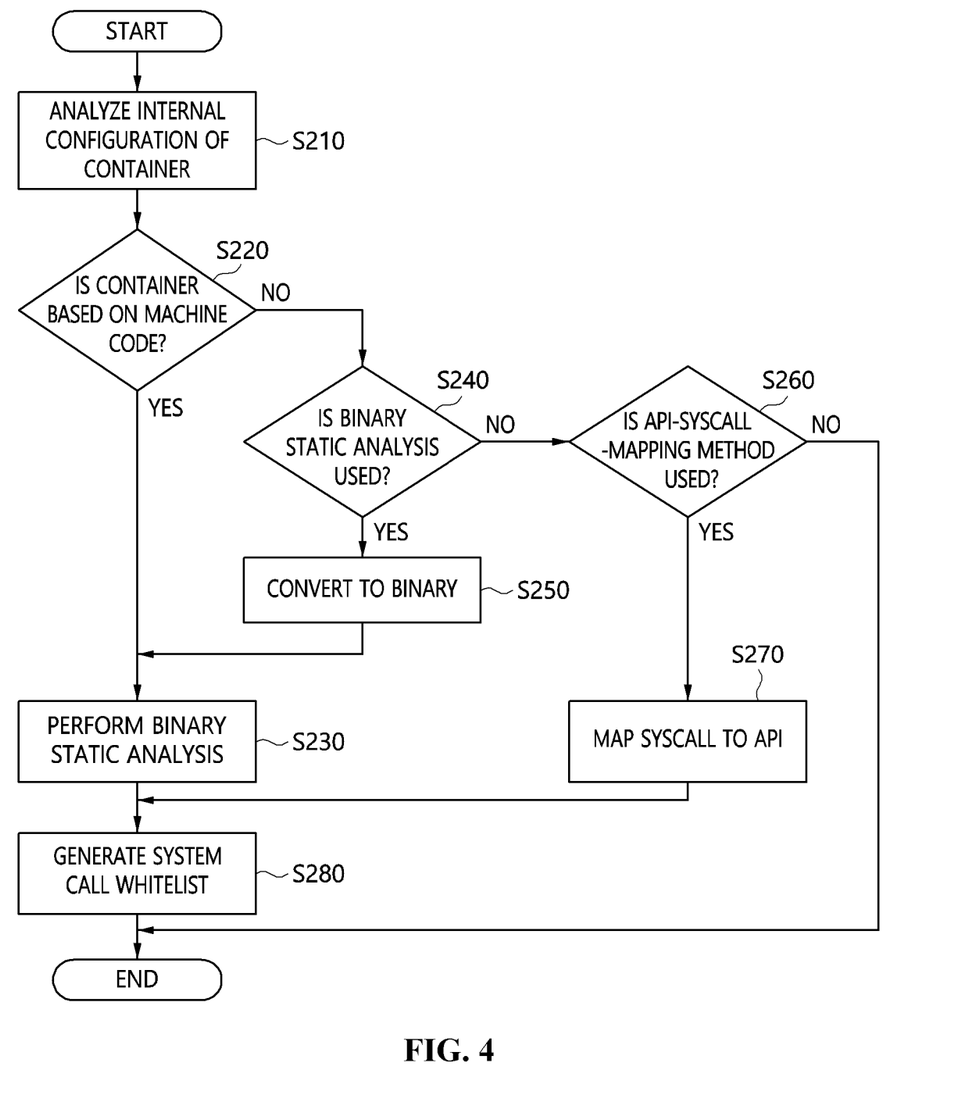
FIG. 4 is a flowchart for explaining a method for generating a system call whitelist for an application container according to an embodiment.

FIG. 3 is a schematic block diagram of an apparatus for generating a system call whitelist for an application container according to an embodiment, and FIG. 4 is a flowchart for explaining a method for generating a system call whitelist for an application container according to an embodiment.

Referring to FIG. 3 and FIG. 4, a container configuration analysis module 110 analyzes the internal configuration of a running container at step S210. A detailed description thereof will be made later with reference to FIG. 5.

The container configuration analysis module 110 determines whether the target container is based on machine code or non-machine code at step S220 based on the analysis result.

For example, when the target container includes an executable file, a shared library, and a configuration file, as shown in FIG. 2, the container configuration analysis module 110 determines that the target container is a container based on machine code.

When the target container includes bytecode or script code running on the runtime as well as a runtime binary and a configuration file, the container configuration analysis module 110 may determine that the target container is a container based on non-machine code.

Then, system calls included in the application are identified at steps S220 to S270 through any one of binary static analysis and API-syscall mapping, which is selected depending on the determination result acquired at step S220.

Here, in order to identify system calls included in the application, it is assumed in the embodiment that a static analysis method is used for analysis of the input container image in order to generate a system call whitelist. For example, in a docker environment, the writer of a custom SECCOMP profile or a system call whitelist may use static binary analysis in order to analyze an application container based on machine code, or may perform static analysis of source code in order to analyze an application container based on non-machine code.

Accordingly, when it is determined at step S220 that the target container is based on machine code, a binary static analysis subsystem 120 identifies system calls included in the application using a binary static analysis module 122 at step S230. A detailed description thereof will be made later with reference to FIG. 6.

Conversely, when it is determined at step S220 that the target container is based on non-machine code, system calls included in the application may be identified using the binary static analysis subsystem 120 or an API-syscall-mapping subsystem 130, which is selected at step S240. This selection may be arbitrarily made by an administrator.

When the use of binary static analysis is decided on at step S240, the binary conversion module 121 of the binary static analysis subsystem 120 converts the bytecode or script code, extracted by the container configuration analysis module 110, into a binary form including machine code at step S250.

For example, Java bytecode is decompiled into Java source code and is then converted into a binary, or the Java bytecode is converted into a binary without decompilation. Here, a tool such as a GNU Compiler for Java (GCJ) may support this process. Alternatively, a binary based on machine code may be generated by emulating a Just-in-time (JIT) compiler of a Java virtual machine.

Also, in the case of script code, such as Python code or the like, the script code is translated into C/C++ source code and is then compiled, or the script code is directly converted into a binary, whereby the binary to be analyzed may be output.

Then, the binary static analysis module 122 receives the binary and identifies the system calls included in the application at step S230.

On the other hand, when the use of an API-syscall-mapping method is decided on at step S240, the API-syscall-mapping subsystem 130 performs API-syscall mapping, thereby identifying the system calls included in the application at step S270. A detailed description thereof will be made later with reference to FIG. 7.

After the process of identifying the system calls included in the application is performed depending on the determination of whether the container is based on machine code or non-machine code through steps S220 to S270, a system call whitelist generation module 140 generates a whitelist based on all of the identified system calls at step S280 and finishes the process.

Figure 5:
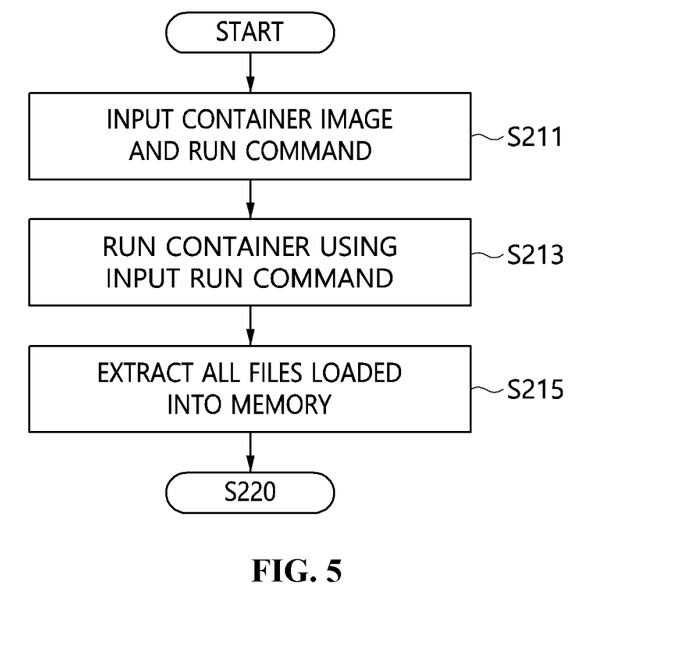
FIG. 5 is a flowchart for explaining the step of analyzing the internal configuration of a container according to an embodiment.

FIG. 5 is a flowchart for explaining the step of analyzing the internal configuration of a container according to an embodiment.

Referring to FIG. 5, upon receiving a container image and a run command for running the container image at step S211, the container configuration analysis module 110 runs the container using the received run command at step S213.

For example, an nginx container may be run using the command "docker run -d -p 8080:80 nginx" in the docker container environment.

Then, the container configuration analysis module 110 extracts files loaded into the memory address space of the running container at step S215.

Here, the container configuration analysis module 110 refers to the process information in the proc filesystem when it extracts the files loaded into the memory. Here, the proc filesystem provides information about the running system (hardware and kernel information). In order to enable data and values that are used in the kernel space to be acquired in the user space, it is necessary to call a system function.

However, in order to acquire such information in a simple manner, rather than in a complicated manner, data in the proc filesystem may be used.

For example, the path of the file loaded into the memory is acquired by referring to the maps file of the process information, and the file corresponding to the path may be extracted using a command such as 'docker cp' or the like.

Then, the extracted file is analyzed at step S220 in FIG. 4, whereby whether the container is based on machine code or non-machine code is determined.

Figure 6:
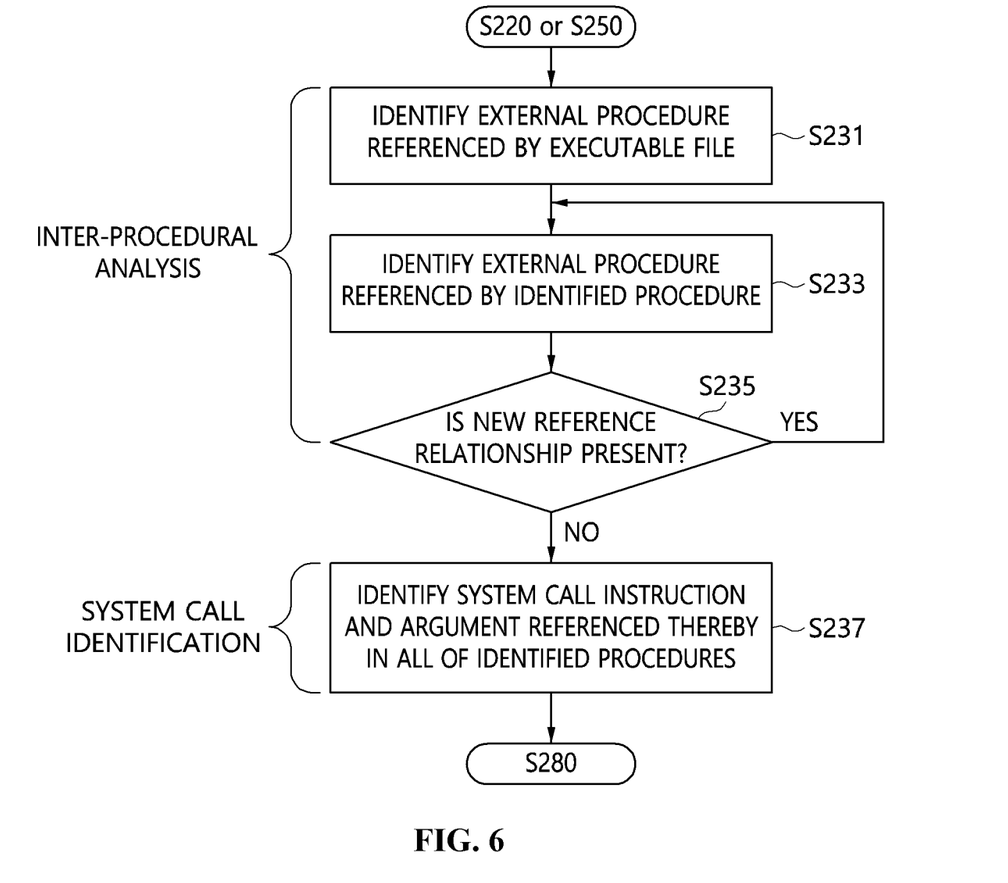
FIG. 6 is a flowchart for explaining a binary static analysis step according to an embodiment.

FIG. 6 is a flowchart for explaining a binary static analysis step according to an embodiment.

Referring to FIG. 6, the binary static analysis step may include an inter-procedural analysis step (S231 to S235) and a system call identification step (S237).

At the inter-procedural analysis step (S231 to S235), the binary static analysis module 122 receives the executable file and the shared library, which are extracted by the container configuration analysis module 110, and identifies all external procedures in the shared library referenced by the executable file or a procedure based on the reference relationship between procedures in the disassembled binary without running the application.

Here, the reference relationship is determined based on whether a specific procedure has logic calling another procedure. For example, if a routine calling procedure B through a call instruction is present in procedure A, the binary static analysis module may determine that there is a reference relationship between A and B.

Specifically, the inter-procedural analysis step (S231 to S235) includes primarily identifying all external procedures in the shared library referenced by the executable file based on the reference relationship between the procedures in the disassembled binary at step S231 and secondarily identifying external procedures referenced by each of the identified external procedures at step S233, and the process of identifying the reference relationship may be performed by repeating step S233 depending on the determination as to whether a newly discovered reference relationship is present at step S235.

The binary static analysis module 122 analyzes the code area of the identified referenced procedure, thereby extracting a system call number at step S237. Here, a syscall instruction and the argument values thereof are checked.

Figure 7:
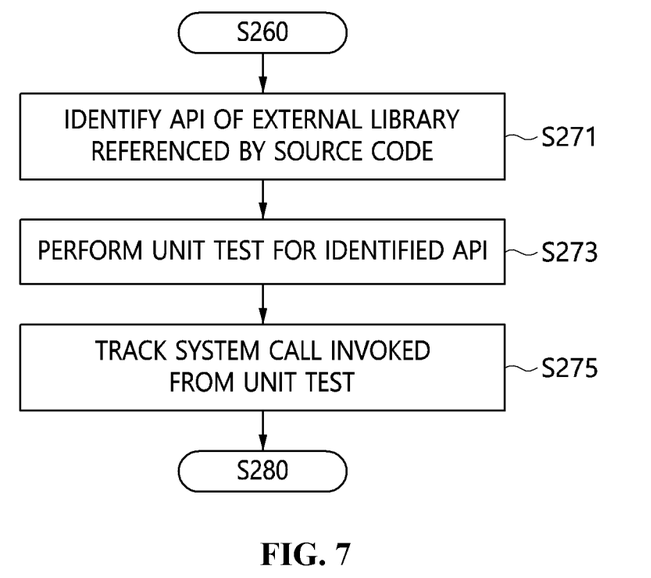
FIG. 7 is a flowchart for explaining an API-syscall-mapping step according to an embodiment.

FIG. 7 is a flowchart for explaining an API-syscall-mapping step according to an embodiment.

Referring to FIG. 7, a unit test generation module 131 first identifies an API of an external library referenced in source code at step S271. Here, when the target is bytecode, the API imported from the external library is identified based on the source code acquired through decompilation.

Then, the unit test generation module 131 generates unit test data for the identified API at step S275.

Here, the unit test generation module 131 automatically generates the test data and test code required for a unit test. For example, in order to test a Java class or method, argument values required for invocation are randomly generated, and code for calling the API by receiving the corresponding argument values may be generated.

Then, a unit test module 132 monitors the system calls that are invoked during the execution of the generated unit test code and records the invoked system calls at step S275.

After the test is finished, the unit test module 132 maps the recorded system calls to the target API. As the result of this process, an API-syscall map pertaining to the target application may be acquired.

The system call whitelist generation module 140 generates a whitelist based on the identified API-syscall map at step S280 in FIG. 4 and finishes the process.

Meanwhile, as described above, a program in the kernel space that is capable of controlling system calls based on the generated whitelist is required. Therefore, an embodiment proposes an apparats and method for applying the generated whitelist in the container execution environment.

Figure 8:
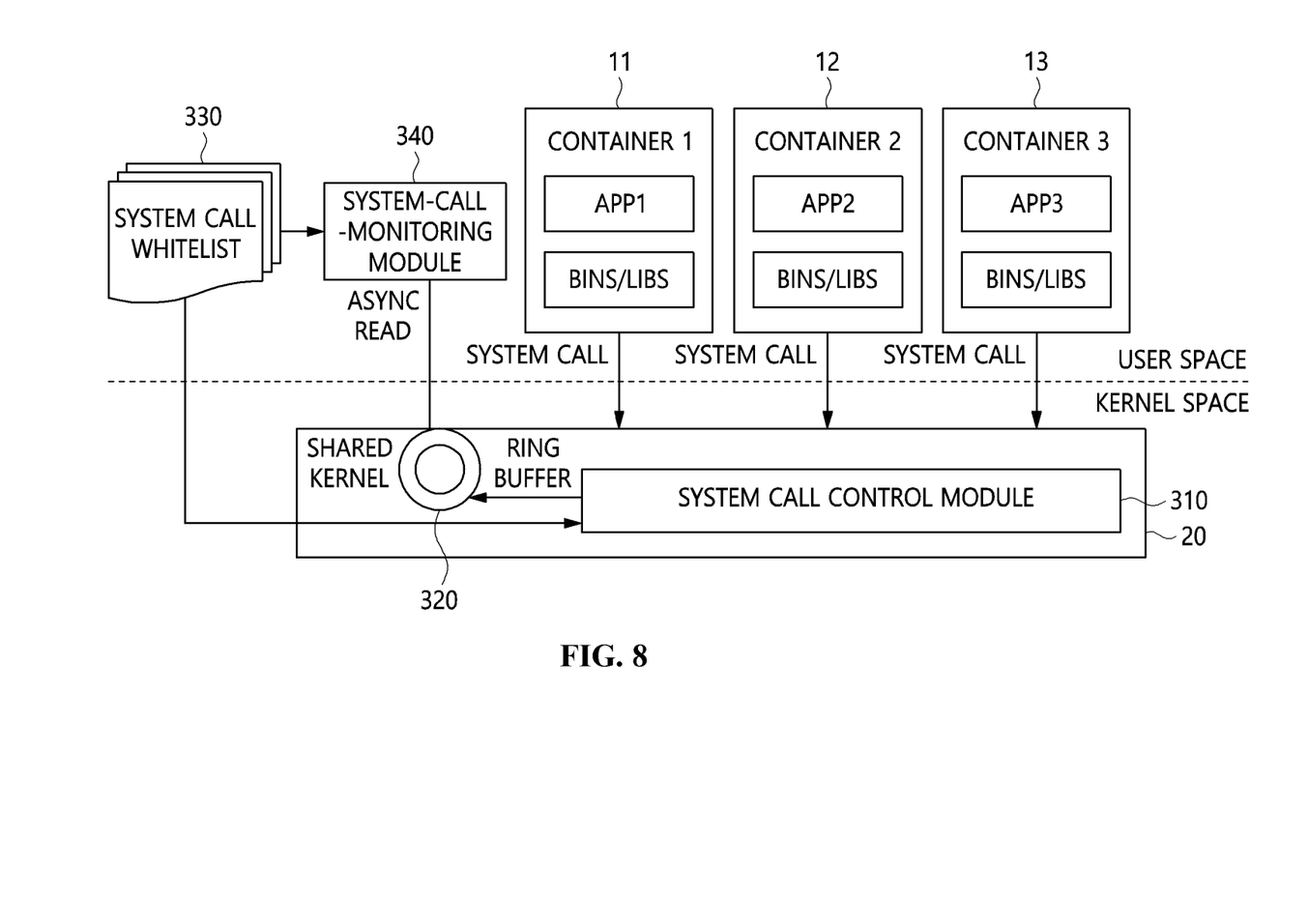
FIG. 8 is a schematic block diagram of an apparatus for controlling a system call of an application container according to an embodiment.
Figure 9:
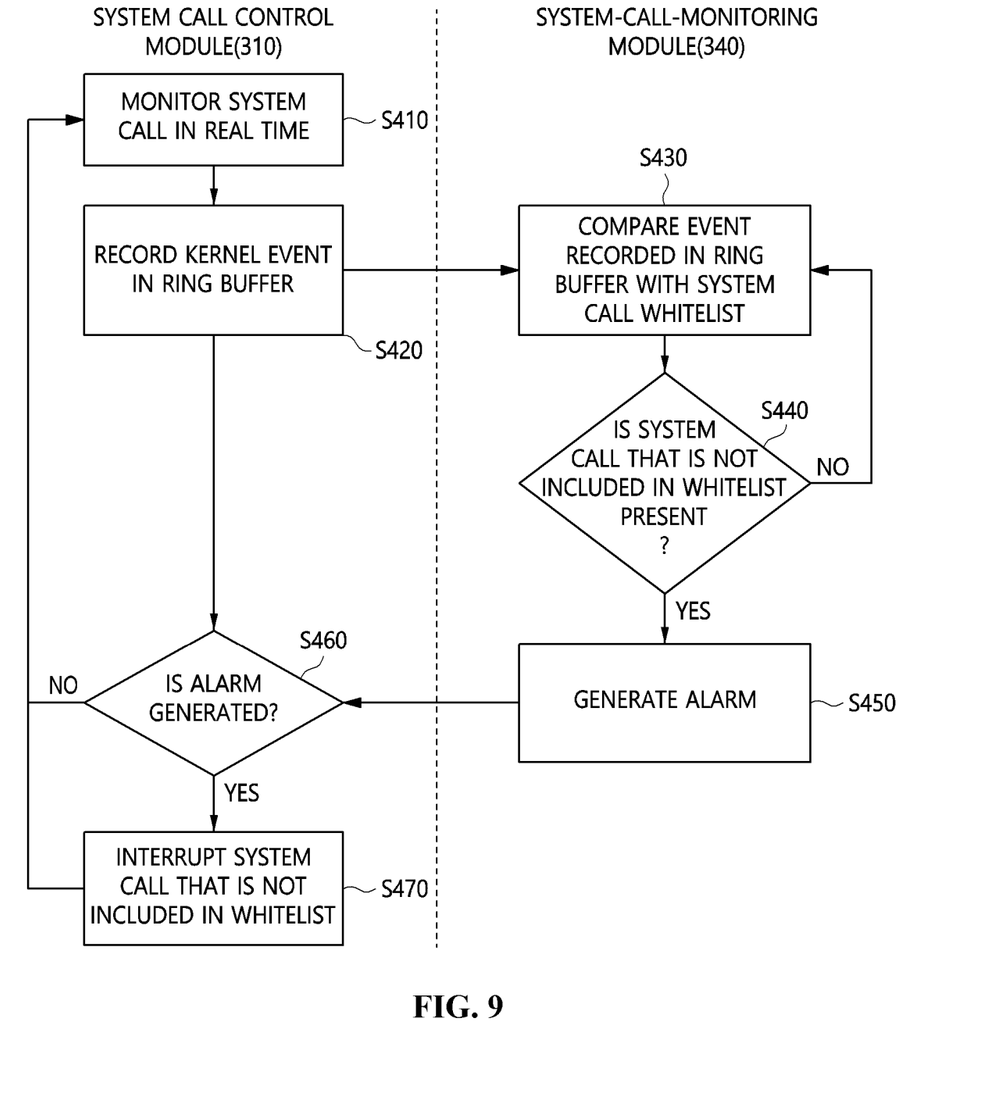
FIG. 9 is a flowchart for explaining a method for controlling a system call of an application container according to an embodiment.

FIG. 8 is a schematic block diagram of an apparatus for controlling a system call of an application container according to an embodiment, and FIG. 9 is a flowchart for explaining a method for controlling a system call of an application container according to an embodiment.

Referring to FIG. 8 and FIG. 9, a system call control module 310 according to an embodiment is located in the kernel space, and operates in a monitoring mode (S410 to S430) or in an interruption mode (S470). Here, the system call control module in the form of a seccomp-bpf program or the like may be inserted in the kernel space, thereby filtering system calls.

First, in the monitoring mode, the system call control module 310 monitors the system calls of the application containers 11, 12 and 13 in real time at step S410.

Here, the system call control module 310 uses a kernel-function-hooking method or the like and operates in the kernel space by being implemented in the form of a kernel module or an extended Berkley Packet Filter (eBPF) program.

When a kernel event specified by a user is triggered, the system call control module 310 records the kernel event in a ring buffer 320 at step S420.

The system-call-monitoring module 340, which is located in the user space, reads the record stored in the ring buffer 320 in an asynchronous manner (async read) and compares the read record with the system call whitelist 330, which is generated through the above-described method, at step S430.

Here, the system call whitelist 330 may be generated for each of one or more application containers through the method described with reference to FIGS. 3 to 7, and may comprise multiple system call whitelists.

Using the comparison result acquired at step S430, the system-call-monitoring module 340 determines at step S440 whether a system call that is not included in the whitelist is invoked.

When it is determined at step S440 that a system call that is not included in the whitelist is invoked, the system-call-monitoring module 340 generates an alarm at step S450.

Conversely, when it is determined at step S440 that a system call that is included in the whitelist is invoked, the system-call-monitoring module 340 continuously performs steps S430 to S440.

Meanwhile, the system call control module 310 determines at step S460 whether an alarm is generated by the system-call-monitoring module 340.

When it is determined at step S460 that an alarm is generated, the mode of the system call control module 310 is switched to the interruption mode, whereby the system call of the application container, which is determined not to be included in the whitelist based on the generated whitelist, is interrupted at step S470.

When it is determined at step S460 that no alarm is generated, the system call control module 310 continuously repeats the operation of the monitoring mode (S410 to S430).

Figure 10:
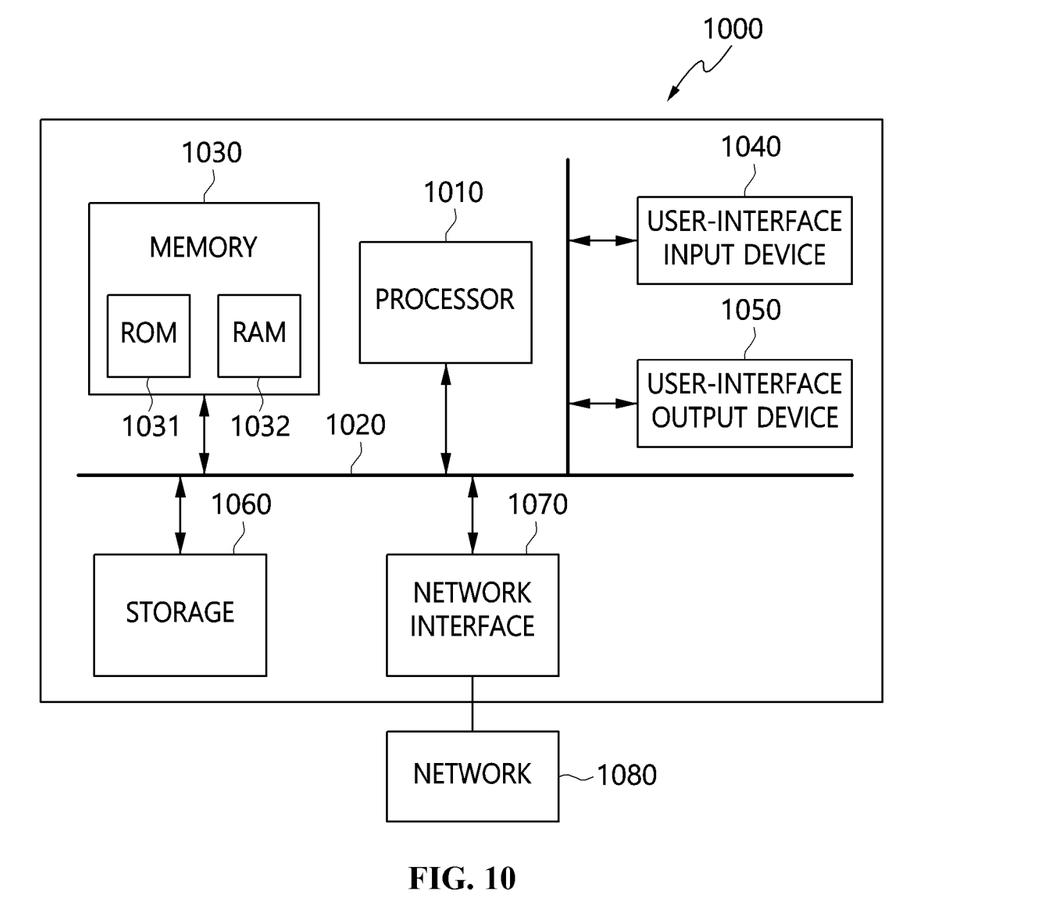
FIG. 10 is a view illustrating a computer system configuration according to an embodiment.

FIG. 10 is a view illustrating a computer system configuration according to an embodiment.

Each of the apparatus for generating a system call whitelist for an application container and the apparatus for controlling a system call of an application container according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, and an information delivery medium. For example, the memory 1030 may include ROM 1031 or RAM 1032.

According to an embodiment, a system call of an individual container instance running in an application virtualization environment based on a container is controlled, whereby, when the container is run, security and security monitoring may be enhanced.

Although the embodiments of the present invention have been described with reference to the accompanying drawings, those skilled in the art will appreciate that the present invention may be practiced in other specific forms without changing the technical sprit or essential features of the present invention. Therefore, the embodiments described above are illustrative in all aspects and should not be understood as limiting the present invention.

What is claimed is:

1. A method for generating a system call whitelist for an application container, comprising:
    determining whether a running container is based on machine code or non-machine code by analyzing an internal configuration of the running container;
    identifying system calls through binary static analysis when the container is determined to be based on machine code, and through static analysis of source code when the container is determined to be based on non-machine code; and
    generating a whitelist based on numbers of all of the system calls identified through the binary static analysis and the static analysis of source code.

2. The method of claim 1, wherein determining whether the container is based on machine code or non-machine code comprises:
    running the container using a run command in response to input of a container image and the run command;
    extracting files loaded into a memory address space of the running container; and
    determining whether the container is based on machine code or non-machine code by analyzing the extracted files.

3. The method of claim 1, wherein determining whether the container is based on machine code or non-machine code is configured to:
    determine that the container is based on machine code when the container includes an executable file, a shared library, and a configuration file, and determine that the container is based on non-machine code when the container includes bytecode or script code in addition to a runtime binary and a configuration file.

4. The method of claim 3, wherein the binary static analysis comprises:
identifying all external procedures in the shared library referenced by the executable file or a procedure based on a reference relationship between procedures in a disassembled binary; and
extracting system call numbers by analyzing code areas of the identified procedures,
wherein the reference relationship is determined based on whether a specific procedure has logic calling another procedure.

5. The method of claim 4, wherein the binary static analysis comprises:
primarily identifying all external procedures in the shared library referenced by the executable file based on the reference relationship between the procedures in the disassembled binary; and
secondarily identifying external procedures referenced by each of the identified external procedures,
wherein secondarily identifying the external procedures is repeated when a new reference relationship is found.

6. The method of claim 5, wherein identifying the system calls is configured to perform static analysis in response to input of the executable file and the shared library extracted from the container when the container is based on machine code.

7. The method of claim 5, wherein:
identifying the system calls is configured to perform static analysis of the source code when the container is based on non-machine code, and
performing static analysis of the source code comprises converting the extracted bytecode or script code into a binary form including machine code; and
performing binary static analysis.

8. The method of claim 3, wherein identifying the system calls comprises:
identifying an Application Programming Interface (API) of an external library referenced by the source code when the container is based on non-machine code;
generating unit test data for the identified API; and
monitoring system calls invoked during execution of generated unit test code and recording the invoked system calls, thereby mapping the recorded system calls to the API.

9. The method of claim 8, wherein generating the unit test data is configured to automatically generate test data and test code required for a unit test.

10. An apparatus for generating a system call whitelist for an application container, comprising:
memory in which at least one program is recorded; and
a processor for executing the at least one program,
wherein the at least one program performs:
determining whether a running container is based on machine code or non-machine code by analyzing an internal configuration of the running container;
identifying system calls included in an application through binary static analysis when the container is determined to be based on machine code, and through static analysis of source code when the container is determined to be based on non-machine code; and
generating a whitelist based on numbers of all of the system calls identified through the binary static analysis and the static analysis of source code.

11. The apparatus of claim 10, wherein determining whether the container is based on machine code or non-machine code comprises:
running the container using a run command in response to input of a container image and the run command;
extracting files loaded into a memory address space of the running container; and
determining whether the container is based on machine code or non-machine code by analyzing the extracted files.

12. The apparatus of claim 10, wherein determining whether the container is based on machine code or non-machine code is configured to:
determine that the container is based on machine code when the container includes an executable file, a shared library, and a configuration file, and
determine that the container is based on non-machine code when the container includes bytecode or script code in addition to a runtime binary and a configuration file.

13. The apparatus of claim 12, wherein the binary static analysis comprises:
identifying all external procedures in the shared library referenced by the executable file or a procedure based on a reference relationship between procedures in a disassembled binary; and
extracting system call numbers by analyzing code areas of the identified referenced procedures,
wherein the reference relationship is determined based on whether a specific procedure has logic calling another procedure.

14. The apparatus of claim 13, wherein the binary static analysis comprises:
primarily identifying all external procedures in the shared library referenced by the executable file based on the reference relationship between the procedures in the disassembled binary; and
secondarily identifying external procedures referenced by each of the identified external procedures,
wherein secondarily identifying the external procedures is repeated when a new reference relationship is found.

15. The apparatus of claim 14, wherein identifying the system calls is configured to perform static analysis in response to input of the executable file and the shared library extracted from the container when the container is based on machine code.

16. The apparatus of claim 14, wherein:
identifying the system calls is configured to perform static analysis of the source code when the container is based on non-machine code, and
performing static analysis of the source code comprises:
converting the extracted bytecode or script code into a binary form including machine code; and
performing binary static analysis.

17. The apparatus of claim 12, wherein identifying the system calls comprises:
identifying an API of an external library referenced by the source code when the container is based on non-machine code;
generating unit test data for the identified API; and
monitoring system calls invoked during execution of generated unit test code and recording the invoked system calls, thereby mapping the recorded system calls to the API.

18. The apparatus of claim 17, wherein generating the unit test data is configured to automatically generate test data and test code required for a unit test.

* * * * *